(12) United States Patent
Stuhec et al.

(10) Patent No.: US 8,086,646 B2
(45) Date of Patent: Dec. 27, 2011

(54) SCHEME-BASED IDENTIFIER

(75) Inventors: Gunther Stuhec, Heidelberg (DE); Frank Damaschke, Nussloch (DE)

(73) Assignee: SAP AG, Walldorf (DE)

( * ) Notice: Subject to any disclaimer, the term of this patent is extended or adjusted under 35 U.S.C. 154(b) by 482 days.

(21) Appl. No.: 11/780,907

(22) Filed: Jul. 20, 2007

(65) Prior Publication Data
US 2009/0024655 A1 Jan. 22, 2009

(51) Int. Cl.
*G06F 7/00* (2006.01)
*G06F 17/30* (2006.01)

(52) U.S. Cl. .................. 707/803; 707/793

(58) Field of Classification Search .......... 707/791, 707/802, 803, 793
See application file for complete search history.

(56) References Cited

U.S. PATENT DOCUMENTS

| | | | |
|---|---|---|---|
| 5,414,841 A * | 5/1995 | Bingham et al. ............ 707/100 |
| 5,444,841 A | 8/1995 | Glaser et al. | |
| 6,560,608 B1 | 5/2003 | Tomm et al. | |
| 6,662,237 B1 | 12/2003 | Leckie | |
| 6,694,338 B1 | 2/2004 | Lindsay | |
| 6,757,739 B1 | 6/2004 | Tomm et al. | |
| 7,155,665 B1 | 12/2006 | Browne et al. | |
| 7,194,695 B1 | 3/2007 | Racine et al. | |
| 2002/0116389 A1 | 8/2002 | Chen et al. | |
| 2002/0120506 A1 | 8/2002 | Hagen | |
| 2003/0069794 A1 * | 4/2003 | Hoffman et al. ............ 705/22 |
| 2003/0200216 A1 * | 10/2003 | Hayes et al. ............ 707/9 |
| 2005/0160104 A1 * | 7/2005 | Meera et al. ............ 707/100 |
| 2005/0198074 A1 | 9/2005 | Khayter et al. | |
| 2006/0238919 A1 * | 10/2006 | Bradley ............ 360/128 |
| 2006/0242184 A1 * | 10/2006 | Shur et al. ............ 707/102 |
| 2007/0100672 A1 * | 5/2007 | McBrida et al. ............ 705/6 |
| 2007/0124320 A1 * | 5/2007 | Stuhec ............ 707/101 |
| 2007/0260621 A1 * | 11/2007 | Smolen et al. ............ 707/100 |
| 2007/0288425 A1 * | 12/2007 | Fuerst et al. ............ 707/2 |
| 2008/0263508 A1 * | 10/2008 | Sorensen et al. ............ 717/104 |

OTHER PUBLICATIONS

'Core Components Technical Specification—Part 8 of the ebXML Framework' [online]. UN/CEFACT, 2003, [retrieved on Jul. 20, 2007]. Retrieved from the Intranet: <URL: http://www.unece.org/cefact/ebxml/CCTS_V2-01_Final.PDF>, 113 pages.
'XML Schema Part 2: Datatypes Second Edition' [online]. W3C, 2004, [retrieved on Jul. 5, 2007]. Retrieved from the Internet: URL: http://www.w3.org/TR/2004/REC-xmlschema-2-20041028/, 194 pages.
"Adobe LiveCycle Designer FAQ" *Adobe Systems Incorporated*, 3 pages, 2004.
"Core Components Technical Specification V2.01—Part 8 of the ebXML Framework" for UN/CEFACT, Nov. 15, 2003, pp. 1-113.
XForms 1.1, W3C Working Draft Nov. 15, 2004, Obtained from the Internet at http://www.w3.org/TR/2004/WD-xforms11-20041115, on Dec. 6, 2004, 26 pages.
XML Schema, W3C, Obtained from the Internet http://www.w3.org/XML/Schema on Jan. 3, 2005, 16 pages.

(Continued)

*Primary Examiner* — Shew-Fen Lin
(74) *Attorney, Agent, or Firm* — Fish & Richardson P.C.

(57) ABSTRACT

In general, the subject matter described in this specification can be embodied in methods, systems, and program products. An identification scheme that is to be used for generating at least one identifier for an object is identified. A scheme entity that represents the identification scheme and includes at least one aspect thereof is created. The created scheme entity is stored in a repository such that the scheme entity can be selected for association with the identifier.

14 Claims, 11 Drawing Sheets

OTHER PUBLICATIONS

XForms—The Next Generation of Web Forms, W3C, obtained from the Internet at http://www.w3.org/MarkUp/Forms, on Jan. 3, 2005, 11 pages.

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, Obtained from the Internet at http://www.microsoft.com/office/infopath/prodinfo/overview.mspx, on Jan. 4, 2005, 2 pages.

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep> (4 pages).

GoXML Registry [online], Xenos, 2002 [retrieved on Mar. 23, 2005]. Retrieved from the Internet: <URL: http://www.xmlglobal.com/solutions/prod_goxml_registry.asp> (2 pages).

The Company of The Open Standard Solutions [online], ebXMLsoft Inc., 2001-2004 [retrieved on Mar. 23, 2005]. Retrieved from the Internet: <URL: http://www.ebsmlsoft.com/> (2 pages).

Project: ebXML Registry/Repository: Summary [online], SourceForge.net, 2005 [retrieved on Mar. 23, 2005]. Retrieved from the Internet: <URL: http://sourceforge.net/projects/ebsmlrr > (3 pages).

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhavan, Philip A. Bernstein, and Erhard Rahm, "Generic Schema Matching with Cupid," 2001, *Proceedings of the 27th VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering (ICDE)*, pp. 1-12.

Lucian Popa, Yannis Velegrakis, Renee J. Miller, Mauricio A. Hernandez, Ronald Fagin, "Translating Web Data," 2002, *The Eleventh International WWW Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004.aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles" *ISO/IEC*, document dated Jan. 8, 2004, 25 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 11 pages.

"Information technology—Metadata registries (MDR)—Part 4: Formulation of data definitions," *ISO/IEC*, document dated Jul. 15, 2004, 15 pages.

"Information technology—Specification and standardization of data elements—Part 5: Naming and identification principles for data elements," *ISO/IEC*, document dated Dec. 1, 1995, 20 pages.

Gefeg Edifix, "EDIFIX Functions," [online], Xenos, 2002 [retrieved on Nov. 30, 2005]. <URL: http://www.gefeg.com/en/edifix/fx_functions.htm> (4 pages).

"Information technology—Metadata Registries (MDR)—Part 1: Framework" International Standard ISO/IEC 11179-1; Sep. 15, 2004; (31 pages).

"Information technology—Metadata Registries (MDR)—Part 2: Classification"; International Standard ISO/IEC 11179-2; Nov. 15, 2005 (15 pages).

"Information Technology—Metadata Registries (MDR)—Part 3: Registry Metamodel and Basic Attributes"; International Standard ISO/IEC 11179-3; Feb. 15, 2003 (108 pages).

"Information technology—Metadata Registries (MDR)—Part 4: Formulation of Data Definitions" International Standard ISO/IEC 11179-04; Jul. 15, 2004 (15 pages).

"Information Technology —Metadata Registries (MDR)—Part 5: Naming and Identification Principles"; International Standard ISO/IEC 11179-5; Sep. 1, 2005, 20 pages.

"Information Technology—Metadata Registries (MDR)—Part 6: Registration". International Standard ISO/IEC 111790-6; Jan. 15, 2005, 70 pages.

ebXML Business Process Specification Schema Version 1.01. "Business Process Project Team." May 11, 2001; Oasis 2001, 136 pages.

"Chomsky's Revolution in Linguistics" [online]. The New York Review of Books, 1972, [retrieved on Jul. 13, 2010]. Retrieved from the Internet: <URL: http://www.chomsky.info/onchomsky/19720629.htm> (20 pages).

* cited by examiner

```
<Invoice>
  <Item>
    <Product>
      <ID  @schemeID         = InternalNumberRange    410A
       408 @schemeVersionID  = 1                      410B
           @schemeAgencyID   = http://www.vw.de       410C
          >4711</ID>  408
      ...
    </Product>
    ...
  </Item>
  ...
</Invoice>
```

```
<Invoice>
  <Item>
    <Product>
      <ID                                    >113-105-271</ID>  508
       @schemeID          = PNS  510A
       @schemeVersionID   = 1    510B
       @schemeAgencyID    = http://www.vw.de  510C
    508
    ...
    </Product>
    ...
  </Item>
  ...
</Invoice>
```

FIG. 5

SCHEME-BASED IDENTIFIER

TECHNICAL FIELD

This document relates to an identifier based on an identification scheme.

BACKGROUND

United Nations Center for Trade Facilitation and Electronic Business (UN/CEFACT) has approved and distributed a version 2.01 of a document titled "Core Components Technical Specification-Part 8 of the ebXML Framework". The Core Components specification presents a methodology for developing a common set of building blocks, or core components, for standardizing business transactions between business partners and across industries. The core components define the exchanged information in terms of its semantic and structure and represent the general types of business data in use today.

The UN/CEFACT core components are based on class diagrams using the Unified Modeling Language (UML). A basic core component constitutes a singular business characteristic. In contrast, a broader concept consists of several components that can be individually varied and is therefore called an aggregate core component, because it is a collection of related pieces of business information. Association core components represent associations between different core components. Thus, any core component is generally classified as being either a basic, an aggregate or an association core component. In addition, the type of information that a basic core component may contain is defined through a core component type. Core component types have no business semantic (meaning).

While all core components bear specific semantics, none of them carry any notion of the business context in which they are to be used. Rather, for every specific business context the core component takes the form of a piece of business data called a business information entity. Like core components, the business information entities come in the three flavors basic, aggregate and association, which have essentially the same meaning here. Thus, every business information entity is based on a core component and is intended for use in a specific business context. The business information entity contains a narrower definition than the corresponding core component, may have fewer properties, and the allowed values of properties may be restricted. The names of business information entities can be derived by adding a qualifier to the name of the corresponding core component.

The core data type "Identifier. Type" defined by CCTS can have several supplementary components. The standard does not specify how to use, implement or process these, in business applications or otherwise. Business-to-business (B2B) exchange for its interoperability depends on a usage of these and similar components, and moreover that the usage be consistent.

SUMMARY

In a first aspect, a computer-implemented method of configuring a system for an identification scheme includes identifying an identification scheme that is to be used for generating at least one identifier for an object. The method includes creating a scheme entity that represents the identification scheme and includes at least one aspect thereof The method includes storing the created scheme entity in a repository such that the scheme entity can be selected for association with the identifier.

Implementations can include any, all or none of the following features. The system can include an object model defining that a type of the object is associated with at least one identifier type to be associated with the identifier. The identification scheme can define a structure for generating the identifier, including multiple parts each defining a pattern for the identifier. The aspect can include a maximum length for generating the identifier. The aspect can include a formatting regulation for generating the identifier. The aspect can include at least one rule for construing content of the identifier. The aspect can include a definition of any separation sign to be placed between at least two portions of the identifier. The aspect can include an identification of a function to be performed on the identifier for determining a validity of the identifier. The scheme entity can be created such that the identifier is defined as comprising several parts, at least one of the parts including a value of a data element for a document. The scheme entity can be configured to reference the value of the data element. The data element can specify a context in which the identifier is unique. The scheme entity can be configured to concatenate the value of the data element. The identifier can be construed at least in part from the data element, and the identifier can be unique regarding a type of the object.

In a second aspect, a computer program product is tangibly embodied in a computer-readable medium and includes instructions that when executed by a processor perform a method of configuring a system for an identification scheme. The method includes identifying an identification scheme that is to be used for generating at least one identifier for an object. The method includes creating a scheme entity that represents the identification scheme and includes at least one aspect thereof The method includes storing the created scheme entity in a repository such that the scheme entity can be selected for association with the identifier.

In a third aspect, a computer-implemented method of communicating an identifier includes identifying an identifier for an object. The method includes obtaining a scheme entity identifier from a schema to be used for an electronic communication, the scheme entity identifier being associated with a scheme entity that represents an identification scheme for generating the identifier. The method includes forwarding the electronic communication, including the identified identifier and the obtained scheme entity identifier.

Implementations can include any, all or none of the following features. The method can further include assigning to the scheme entity identifier, before forwarding the electronic communication, at least one supplementary component that further identifies the identification scheme. The supplementary component can be at least one selected from the group: a scheme version identifier that identifies a version of the identification scheme; a scheme agency identifier that identifies an agency responsible for the identification scheme; and a scheme uniform resource identifier that identifies a resource for the identification scheme. Identifying the identifier can include concatenating at least two values to form the identifier. At least a first one of the values can be an internal identifier, and the method can further include selecting at least one context value associated with the internal identifier as a second one of the values. The identification scheme can define a structure for generating the identifier, including multiple parts each defining a pattern for the identifier. The method can further include generating the identifier according to the patterns using the defined structure, including selecting data from another component and performing a calculation relating to validation of the identifier. The object can have associated therewith multiple identifiers for respective multiple identification schemes, and identifying the identifier can include selecting at least the identifier at runtime from among the multiple identifiers.

In a fourth aspect, a computer program product is tangibly embodied in a computer-readable medium and includes instructions that when executed by a processor perform a method of communicating an identifier. The method includes identifying an identifier for an object. The method includes obtaining a scheme entity identifier from a schema to be used for an electronic communication, the scheme entity identifier being associated with a scheme entity that represents an identification scheme for generating the identifier. The method includes forwarding the electronic communication, including the identified identifier and the obtained scheme entity identifier.

In a fifth aspect, a computer-implemented method of processing a received identifier includes receiving an electronic communication that includes an identifier indicated by an identifier element. The method includes obtaining, from a schema applicable to the electronic communication, a scheme entity that represents an identification scheme for the identifier and includes at least one aspect of the identification scheme. The method includes using the scheme entity in processing the identifier.

Implementations can include any, all or none of the following features. The processing can include performing a validity determination on the identifier. The validity determination can be performed using a function identified in the scheme entity. The identification scheme can define a structure for generating the identifier, including multiple parts each defining a pattern for the identifier, and the processing of the identifier can take into account the structure and the patterns.

In a sixth aspect, a computer program product is tangibly embodied in a computer-readable medium and includes instructions that when executed by a processor perform a method of processing a received identifier. The method includes receiving an electronic communication that includes an identifier indicated by an identifier element. The method includes obtaining, from a schema applicable to the electronic communication, a scheme entity that represents an identification scheme for the identifier and includes at least one aspect of the identification scheme. The method includes using the scheme entity in processing the identifier.

Implementations can provide any, all or none of the following advantages: providing an improved use of an identifier; providing improved processing of an identifier to be sent in an electronic communication; providing improved processing of a received identifier; providing improved representation of an identification scheme; providing a unique and unambiguous reference to identification schemes; providing flexible use of diverse identification schemes for one object identifier at runtime which also describes the patterns of identifiers; providing flexible, consistent and comprehensive assembly of identifiers according to patterns of an identifier scheme; and providing validation of identifiers according to such patterns at runtime.

The details of one or more embodiments are set forth in the accompanying drawings and the description below. Other features and advantages will be apparent from the description and drawings, and from the claims.

DESCRIPTION OF DRAWINGS

FIGS. 3-5 are examples of code relating to an identifier.

Like reference symbols in the various drawings indicate like elements.

DETAILED DESCRIPTION

Figure 1:
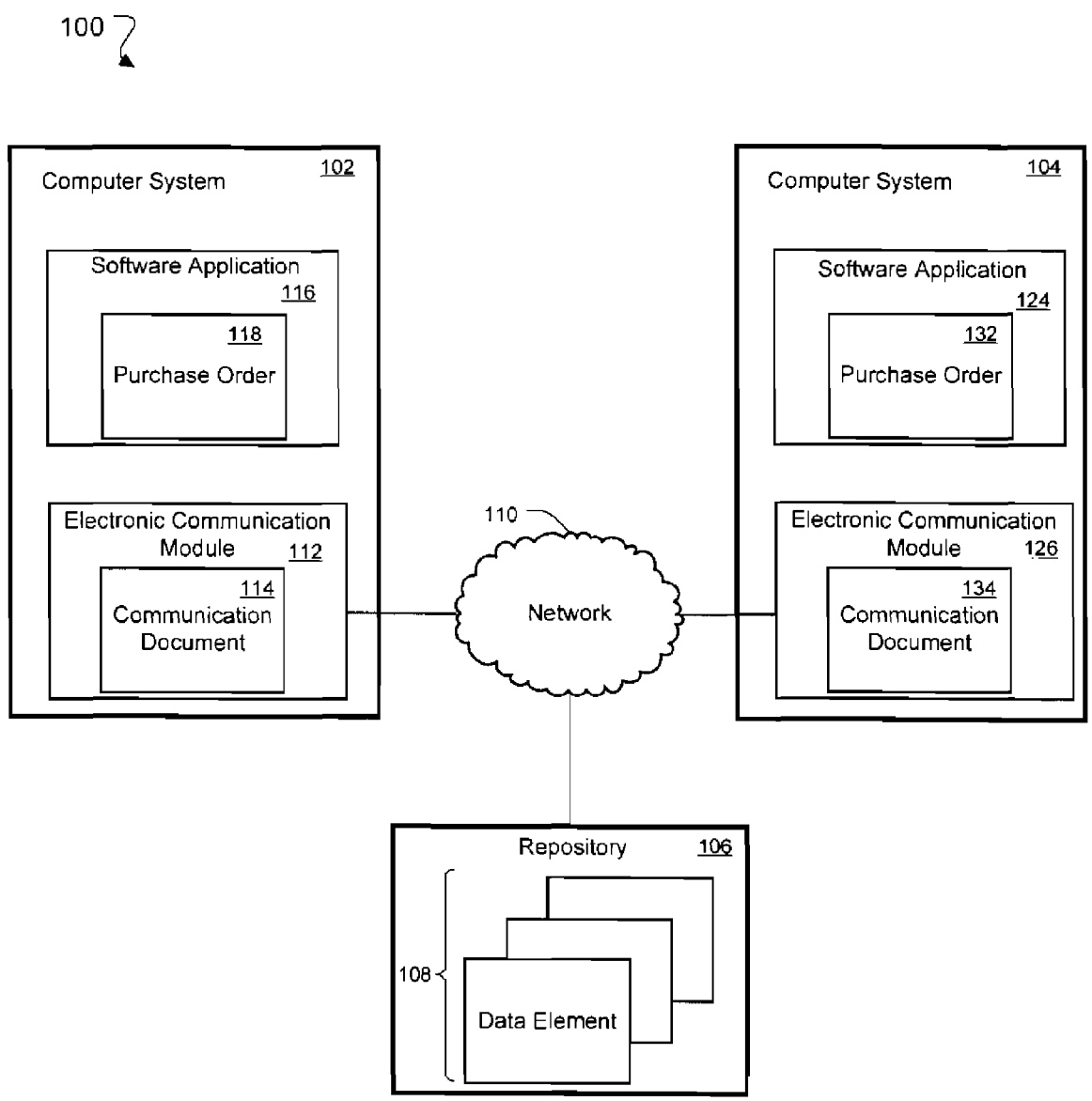
FIG. 1 shows an example of a system that can handle an identifier.

FIG. 1 shows an exemplary system 100 that can be used with one or more scheme entities representing an identification scheme. For example, a data element can be included as a component of an electronic communication, such as in a formatted electronic document, to identify a specific information category or information portion therein. In some examples, each of the data elements may be associated with one or more contexts that qualify and refine the data elements according to their use. Using the system 100, for example, business partners can identify business data components for creating electronic communication documents (e.g., purchase orders, invoices, contact information, product catalogs, etc.). The description below will give examples of configuring a system for an identification scheme, and also of communicating and interpreting identifiers.

The system 100 includes computer systems 102, 104 and a repository 106. For example, each of the computer systems 102, 104 may be operated by one of the parties of an electronic communication. As shown, the repository 106 stores a plurality of data elements 108. In some embodiments, the repository 106 can also store one or more scheme entities. Particularly, such scheme entities can represent identification schemes for generating identifiers to be associated with any of the data elements.

The repository 106 and the computer systems 102, 104 are connected via a network 110 (e.g., the Internet). In one example, the computer systems 102, 104 can access the repository 106 to obtain definitions and properties of the data elements 108 through the network 110. In one example, a scheme entity in the repository 106 can be used in interpreting an identifier that is included in a received electronic communication.

The computer system 102 includes an electronic communication module 112 to interface with the network 110. In this example, the electronic communication module 112 includes a communication document 114. In one example, the electronic communication module 112 may transmit the communication document 114 to the computer system 104 through the network 110. In another example, the electronic communication module 112 may receive the communication document 114 from the computer system via the network 110.

The computer system 102 also includes a software application 116 for processing electronic documents for electronic communications. For example, the software application 116 may be a software editor that presents electronic documents. In the depicted example, the software application 116 includes a purchase order 118 for processing. In one example, the software application 116 may include data elements to create the purchase order 118 to be transmitted to the computer system 104. In another example, the software application 116 may identify data elements in the communication document 114 and present the purchase order 118 according to the data elements.

By way of example, an identifier can form one or more data elements in a document. The identifier can be unique with respect to a particular object class, such as a material, a business partner or a purchase order. For example, the identifier can identify an object. As another example, the identifier can reference one or more other objects, within or outside the present instance. The identifier can include a character string, for example a number selected from a number range. The identifier can be built from one or more parts. Any part may or may not be modeled as a separate data element.

In one embodiment, the computer system 102 can assign a scheme entity to an identifier that is to be included in an electronic communication. For example, an electronic document that represents a purchase order should include an identifier for each product being sold. Such product can be identified by any of multiple identification schemes. For example, the manufacturing company may have an internal numbering scheme that assigns a unique number to the product according to its model and specific configuration. As another example, a standardized numbering scheme such as the International Standard Book Number (ISBN) scheme can be used. In any event, the identifier selected for the product will be included in the purchase order and there associated with a data element representing the product itself (e.g., a product data element). Moreover, the scheme entity in the repository 106 that represents the particular identification scheme used in generating the identifier will be associated with the identifier in the message. This can allow for better processing of the outgoing electronic message and/or for improved interpretation and processing thereof by the receiver, such as the system 104.

By way of example, a scheme entity can be associated with an identifier in a document. In some implementations, the scheme entity is associated with the identifier itself, and not directly with any parts thereof. A scheme entity can be identified in any of several ways, such as using a scheme universal resource identifier (URI) or by one or more supplementary components that can be associated with an identifier. In such implementations, the one or more supplementary components uniquely identify the scheme entity. The properties of a scheme entity can be identifier length, identifier separation signs, a check sum to be applied to the identifier(s), to name a few examples.

The computer system 104 here includes a software application 124 and an electronic communication module 126. A user of the computer system 104 can use the software application 124 to edit or review, in this example, a purchase order 132. The user can also use the computer system 104 to transmit or receive a communication document 134 via the network 110. The components bearing the same name as components in the system 102 may have identical or similar functions to those components.

In operation, the users of the computer systems 102, 104 can create one or more electronic documents, such as the purchase orders 118, 132, that include one or more data elements associated with an identifier. For example, the users can cause the respective system to associate the proper scheme entity with a generated identifier in an electronic communication before it is sent.

As an illustrative example, the communication document 134 received in the system 104 may include an identifier generated according to an identification scheme that provides a checksum calculation for the identifier. That is, a portion of the generated identifier can be one or more characters calculated from a remainder of the identifier (or from other data) using a particular algorithm. This can allow the system 104 to verify the authenticity of the identifier in the processing of the received message.

Figure 2:
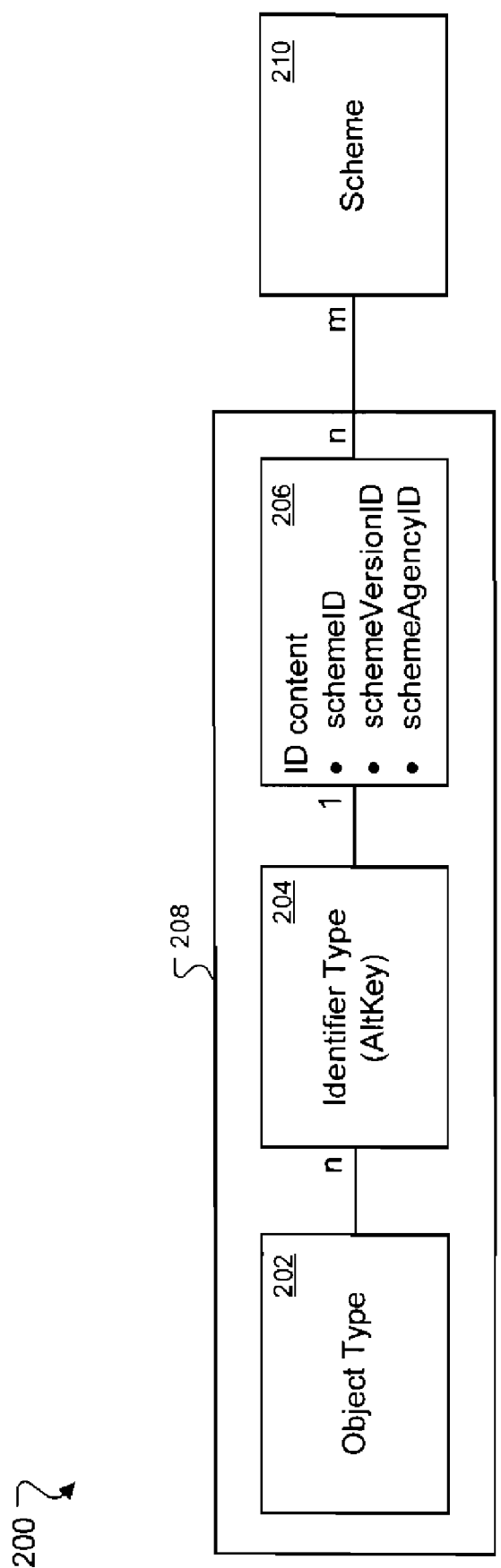
FIG. 2 is an example of an object model relating to an identifier.

FIG. 2 is a model diagram that schematically shows an object identification model 200. In the model 200, each object is associated with a unique object type 202, such as a material, a business partner or a purchase order, to name just a few examples. More than one identifier can be assigned to each object. For example, a product can have at least an internal identifier, one or more standard identifiers, and a serial identifier. Accordingly, the object type 202 can be associated with any number of (e.g., having "n" relations to) identifier types 204. That is, each of the internal, standard, serial or inventory identifiers in the above example can have a corresponding identifier type 204 and the product at issue will be associated with any or all of them as appropriate. An ID content 206 represents the actual content of the identifier. For example, this can be an identifier number such as "4711" or "0-3855-1322-4". Thus, the object being identified (a product in this example) has its object type 202 and one or more identifier types 204, and an ID content 206 for each such identifier type 204. Collectively, the elements 202, 204 and 206 can be considered an object model aspect 208.

The object model aspect 208 is here associated with at least one scheme entity 210 that represents an identification scheme for generating one or more identifiers. For example, the scheme entity 210 can represent a numbering scheme used internally within a particular manufacturer or it can represent a standardized numbering scheme such as ISBN. In later examples, it will be described that the scheme entity 210 can include at least one aspect of the identification scheme and can be used in the processing of the identifier included in the ID content 206. Assuming that each unique identifier is generated according to a specific identification scheme, the model aspect 208 is associated with "n" number of the scheme entities 210. Similarly, each of the scheme entities 210 can be associated with "m" number of the model aspects 208. In this example, the scheme entity is associated with the model aspect 208 that encompasses the object type 202, identifier type 204 and ID content 206, and in other implementations it can be associated otherwise, such as directly with the ID content 206.

Figure 3:
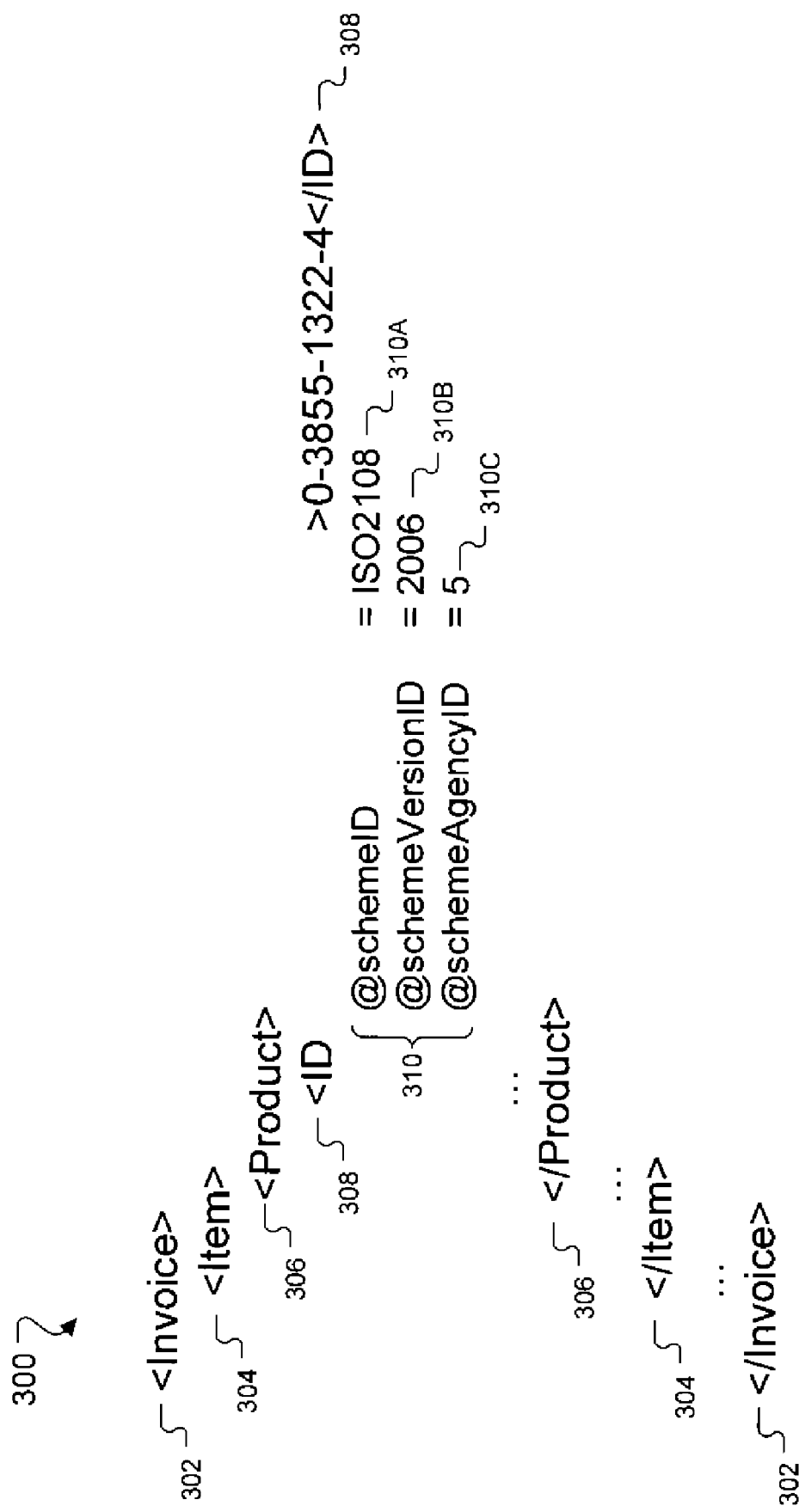

FIG. 3 shows an example of code 300 that can be included in an electronic communication, such as in the document 114, to facilitate product identification. In this example, the code 300 relates to an invoice, as indicated by code 302. The invoice covers one or more items, as indicated by code 304. An item includes one or more products, as indicated by code 306. The product, in turn, has associated therewith one or more identifiers, as indicated by code 308. One or more of the identifiers can have metadata 310 associated with it.

Here, the content of the code 308 is "0-3855-1322-4". This is the identifier that has been generated for the particular product covered by the code 306. In this example, the product is a book and the identifier is generated using the ISBN standard. The identifier can be provided with the metadata 310.

One or more supplementary component(s) can be provided to an identifier to further identify the identification scheme. Here, supplementary components 310 A-C have been provided. For example, a scheme identifier 310A can identify the identification scheme. Here, the identification scheme is identified as "ISO2108", which is the technical identifier for ISBN. Accordingly, the identifier 310A can correspond to the scheme entity 210 (FIG. 2). For example, a version identifier 310B can identify a version of the identification scheme. Here, the identifier 310B contains "2006", which indicates that a version of the ISBN standard from 2006 is being used. Other ways of indicating version can be used, such as by listing a version number.

As another example, an agency identifier 310C can identify the agency that is responsible for the identification scheme used in generating the identifier. Here, the identifier 310C contains "5", which is the entry corresponding to the International Standardization Organization (ISO) in the code list issued by UN/CEFACT.

Accordingly, the metadata 310 here indicates that the identifier in the code 308 is generated using the 2006 version of ISBN and that ISO is the international organization that is responsible for uniqueness of the identifier. Similar or other identifiers and/or metadata can be used for any identifier associated with another product and/or item in the illustrated invoice.

FIG. 4 is another example showing code 400 that can be included in an electronic communication. Aspects of the code 400 not specifically mentioned here can be similar or identical to the corresponding aspect(s) of the code 300. In this example, the identifier included in code 408 contains "4711" and is assumed to be a default identifier whose uniqueness is the responsibility of the organization that generates it. That organization is chosen to be Volkswagen (VW) purely for purposes of illustration. Thus, 4711 may be a default identifier used for a component of a VW product.

Particularly, an identifier 410A here contains "InternalNumberRange" which in this example is an identification scheme that assigns an incrementally higher number (e.g., 4711, 4712, 4713, . . . ) to each new item or object instance being identified. For example, the "InternalNumberRange" identification scheme can be a scheme available in a system available from SAP AG and that is intended as a default scheme. An identifier 410B indicates that version 1 of the "InternalNumberRange" scheme is being used.

The code 400 contains a scheme uniform resource identifier (URI) 410C that identifies a resource for the identification scheme. Here, the resource is the web address http://www.vw.de which is associated with VW. The resource identified by the identifier 410C can be useful for the recipient in seeking further information on the agency/organization that issued the identifier or on the identification scheme itself. In other examples, other information than a URI can be listed, such as a physical address.

Accordingly, the metadata here indicates that the identifier in the code 408 is generated using version 1 of the "InternalNumberRange" scheme and that the listed web resource is associated with the organization that is responsible for uniqueness of the identifier.

FIG. 5 is another example showing code 500 that can be included in an electronic communication. Aspects of the code 500 not specifically mentioned here can be similar or identical to the corresponding aspect(s) of the code 300. In this example, the identifier included in code 508 contains "113-105-271" and is assumed to be a VW part number. That is, the identifier in the code 508 can be generated using VW's part numbering system (PNS), in which a fictitious part number ABC-DEF-GHI can have the following significance:

| Position | Meaning |
|---|---|
| A | Type of car |
| B | Chassis of car |
| C | Side |
| D | Main group number |

-continued

| Position | Meaning |
|---|---|
| EF | Subgroup number |
| GHI | Specific kind of part |

An identifier 510A here contains "PNS" to indicate the identification scheme used. An identifier 510B indicates that version 1 of the PNS scheme is being used. The code 500 contains a scheme URI 510C that in this example identifies the web resource http://www.vw.de.

Accordingly, the metadata here indicates that the identifier in the code 508 is generated using version 1 of the PNS scheme and that the listed web resource is associated with the organization that is responsible for uniqueness of the identifier.

In some implementations, rules such as the table above can be included in the scheme entity 210 (FIG. 2). The accessibility of such rules can allow a system to process the identifier, for example to determine the type of car that the identifier relates to, or to run a checksum calculation on the generated identifier if such functionality is provided. Accordingly, the scheme entity can include at least one rule for construing content of the identifier, to name just one example.

Figure 6:
FIG. 6 is an example of concatenating an identifier.

FIG. 6 is an example where a sender of an electronic communication can use a scheme entity in processing an identifier. Particularly, in this example, the sender will concatenate an internal identifier with other information to generate an external, perhaps globally unique, identifier. Beginning with code 600, this is an internal representation of an expense report for an employee "Hugo" of an organization (VW). Code 602 contains an identifier "12345" which in this example is not intended to be unique outside the organization. That is, more than one employee can have his or her expense report assigned the number 12345 over a period of time. In the internal processing, the various expense reports for different employees can be distinguished from each other because the code 600 in this example also contains code 604 with an employee identifier for Hugo. The code 600 also includes an identifier 606 for the identification scheme and an identifier 608 for the agency issuing the identifier.

The system will now process some or all of the code 600 to generate code 650 intended for external use. Particularly, in this example, the system will concatenate the employee name after the identifier (separated by a hyphen) to form the string 12345-Hugo. This content is then included in code 652 and is here named "ExpenseReportID". Also, a new scheme entity can be created because this identification scheme is made by combining the "InternalNumberRange" scheme with the employee's name. Code 654 indicates that the new scheme can be referred to as a "InternalNumberRange+Employee" scheme. In this example, the URI for the scheme remains the same in code 650 as in the code 600, but in other examples could be different. The scheme identifier can be used to distinguish the identifier used in the code 652 from that used in the code 602 and/or from other identifiers. Moreover, the terminology of the respective code 602 (ID) and the code 652 (ExpenseReportID) can result from the structure of the XML implementation and the naming conventions. For example, if the "ExpenseReport" aggregation in code 600 had not been used, the element name could also have been ExpenseReportID.

In the above example, the employee Hugo can be considered the context that renders the identifier 12345 unique for the particular expense report. In an implementation where the code 650 is to be included in an electronic communication regarding the expense report, the employee can there be represented as one or more data elements (i.e., an "Employee" or a "Person" data element, to name just two examples) in the communication. Moreover, such a data element can specify a context in which the identifier is unique and that context (or part thereof) can be used in generating the identifier. Accordingly, the identifier can be generated by concatenating at least two values. Also, for an internal identifier a context value associated with the internal identifier can be selected as one of the values for the concatenation.

A specific identifier type may have one or more identification schemes. For example, a BBIE named "Book. Identification. Identifier" can be based on a basic data type (BDT) named "Book_Identifier. Type". The BDT, in turn, can include references to schemes such as ISBN, the EAN13 Numbering System, and a company-specific number. The references can be expressed by respective specific supplementary components. In the present example, such supplementary components can include "Identification. Scheme. Identifier", "Identification. Scheme. Version", and "Identification. Scheme_Agency. Identifier". The BBIE "Book. Identification. Identifier" may have a cardinality of 1 . . . 3, which means that one, two or three identifiers based on separate identifier schemes could be instantiated. Such an implementation can appear as follows:

```
<Book>
    <ID schemeID="ISO 2108" schemeVersionID="2006"
schemeAgencyID="5">0-3855-1322-4</ID>
    <ID schemeID="EAN13" schemeVersionID="1"
schemeAgencyID="6">1234567890123</ID>
    <ID schemeID="CompanyBookID" schemeVersionID="1"
schemeAgencyID=http://www.bookcompany.com>123-ABC-2332</ID>
    ....
</Book>
```

Any or all of the identifier schemes can then be selected for use, for example by a selection at runtime.

Figure 7:
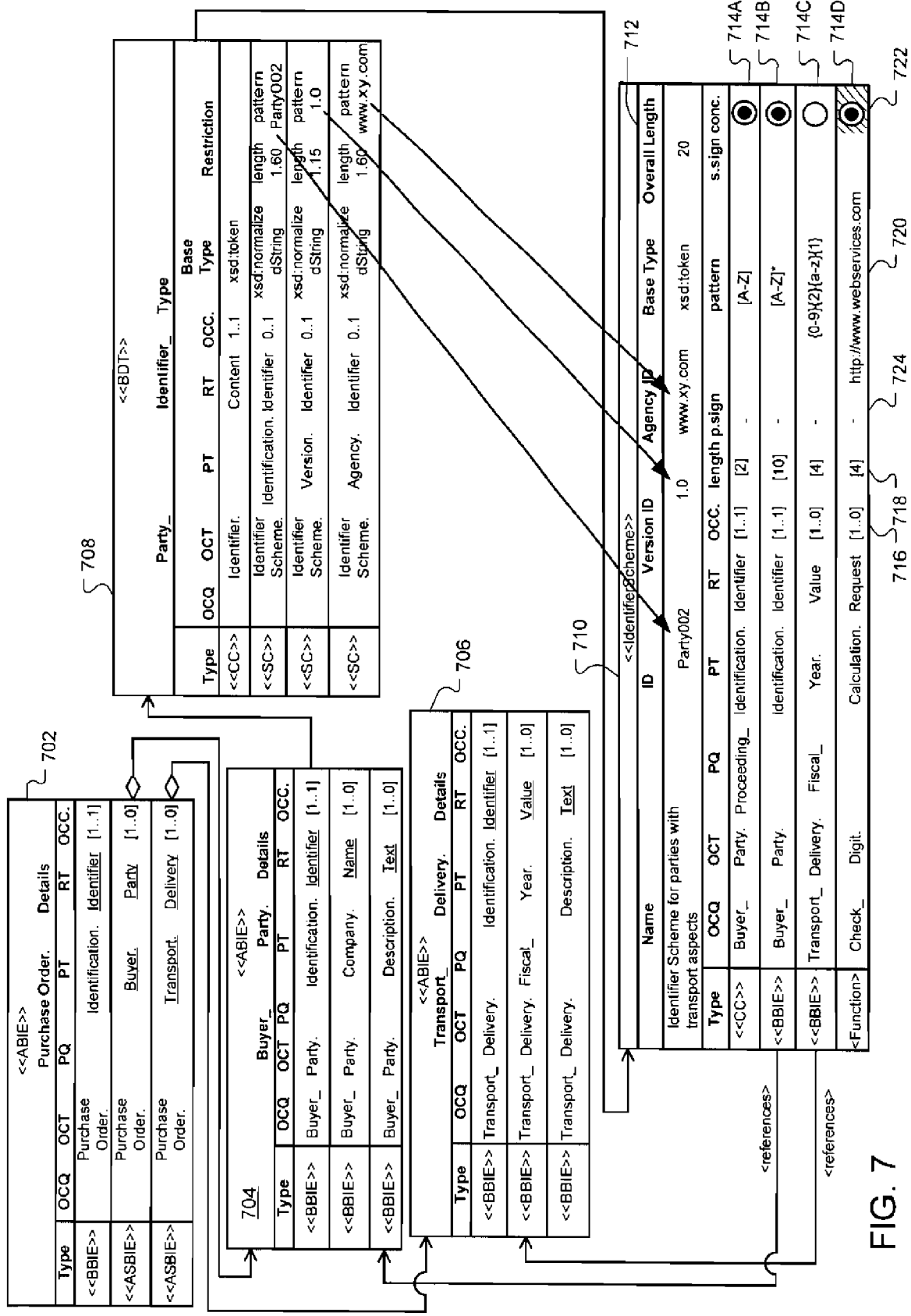
FIG. 7 is an example of data elements relating to an identifier.

FIG. 7 shows an example of a data structure 700 that can be modeled for performing electronic communication. The data structure 700 in this example is based on an ABIE 702 which represents details of a purchase order. The ABIE 702 here includes an identifier BBIE and two ASBIEs: one for the buyer party and one for the transport delivery, respectively. The buyer party, then, is represented by an associated ABIE 704 and the transport delivery details by an ABIE 706.

The BBIE 704 includes a BDT 708 which is here called "Party_Identifier. Type" and that represents the specific type of the identifiers of the object class "Party". For example, it can correspond to the identifier type 204 (FIG. 2). The BDT 708 can be a qualified BDT compliant with CCTS. The BDT 708 specifies an identifier type to be used for the buyer party. In this example, the buyer part has only a single identifier type but in other implementations several identifier types can be used. The BDT 708 here specifies some aspects of the identifier scheme in form of supplementary components of the identifier For example, it specifies that the identifier type can name for the identification scheme: an identifier, a version identifier and an agency identifier. Other types of supplementary components can be used.

The BDT 708 is associated with a scheme entity 710 that represents an identification scheme to be used for generating an identifier for the buyer party. The entity 710 in this example names the identification scheme as "Identifier scheme for parties with transport aspects". Moreover, the identifier for the identification scheme is here Party002, its version is 1.0 and its agency identifier is listed as www.xy.com to indicate a fictitious agency. A field 712 indicates that the Party002 scheme restricts identifiers to an overall length of 20 characters.

Rows 714 specify that the identifier in this example will be made up of several parts. The definition of each or all such parts can include some aspect of the corresponding identification scheme. In various implementations, the information in any or all of the rows 714 can be static data e.g., fixed or default values), data from other components such as BBIEs within or outside the instance, or determined by calculations by one or more functions (e.g., scripts). The information in the rows 714 can be concatenated as defined in the "Identifier Scheme" class to which the entity 710 relates. Other restrictions can be applied. In some implementations, the data is restricted using a specific syntax definition. One example of such a syntax that can be used is the "regular expression" defined by the World Wide Web Consortium in its recommendation "XML Schema Part 2: Datatypes Second Edition" dated Oct. 28, 2004, the entire contents of which are incorporated herein by reference.

A first row 714A specifies that some content of the identifier can be provided by a manual entry field. A column 716 indicates that the manual entry portion is optional, and a column 718 indicates that it is limited to two characters. Moreover, a pattern column 720 indicates a pattern for each of the portions corresponding to the rows 714. Here, the pattern for row 714A is "[A-Z]", indicating that each character in this portion of the identifier can be an upper case letter of the alphabet. Moreover, a concatenation column 722 indicates that this portion is to be concatenated with at least one other portion of the identifier.

A second row 714B in this example is designed to place some content about the buyer party company as a mandatory part of the identifier and therefore references the ABIE 704 where a description of the buyer party is mentioned. This content is here limited to ten characters by the column 718, but the definition for the row 714B in this example contemplates use of an infinite number characters, namely: a possibly unlimited string of the upper-letter characters A-Z. A third row 714C in this example is designed to place some optional content about the fiscal year of transport delivery into the identifier. This row therefore references the ABIE 706 where fiscal year in mentioned. This content is here limited to four characters by the column 718, but the definition for the row 714C in this example contemplates use only three characters, namely: a combination of two numbers (0-9), as indicated by "[0-9] {2}", and one lowercase letter (a-z), as indicated by "[a-z] {1}". Accordingly, when the identifier is to be construed at least in part from the data element, for example, the identifier can be unique regarding a type of the object In contrast to the row 714B, however, the content introduced by the row 714C is not concatenated with the other content. Instead, it is preceded by a separation sign (here a hyphen, or minus) according to a column 724. Accordingly, the scheme entity can be created such that the identifier is defined as comprising several parts, at least one of the parts including a value of a data element for a document. Moreover, the scheme entity can regulate a formatting of the identifier to be generated.

The fourth row 714D in this example relates to performing a calculation to determine validity of the identifier. For example, a checksum calculation can be performed on content provided through any or all of the rows 714A-C and the result of the calculation (e.g., the "checksum") can be included in the identifier itself. For example, such a function can be implemented using programming language or a script.

In other implementations, a calculated value can be stored elsewhere in association with the identifier. In any event, the checksum is optional according to column 716 and can contain four characters according to column 718. Moreover, the pattern column 720 indicates a resource (here, the web address www.webservices.com) for performing the calculation. That is, a system accessing the scheme entity 710 can read the content in the column 720 and use the listed resource to perform the checksum calculation (or any other validity determination function). This can allow the system, which can be the receiver of an electronic communication containing an identifier that indicates the scheme entity, to verify that the identifier conforms with the requirements of the identification scheme. Accordingly, the scheme entity can identify a function to be performed on the identifier for determining a validity of the identifier.

The components or element shown in FIG. 7, such as the ABIEs 702, 704 and 706, the BDT 708 and the scheme entity 710, can have form or structure that lets the system handling the identifier recognize and manipulate them. For example, they can be implemented inform of markup code (e.g., XML code) or other computer-readable code.

Figure 8:
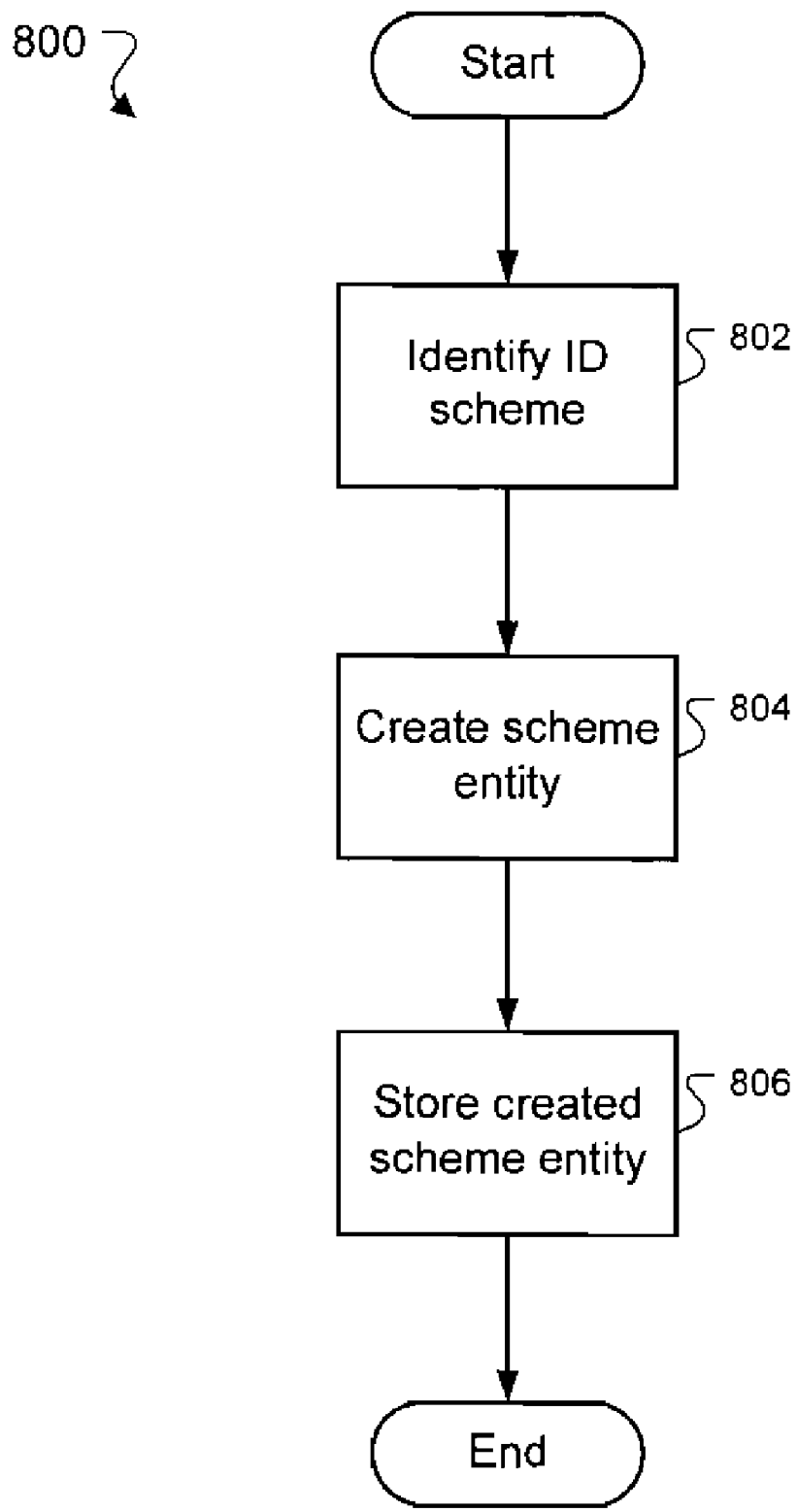
FIGS. 8-10 are flowcharts of examples of methods relating to an identifier.
Figure 9:
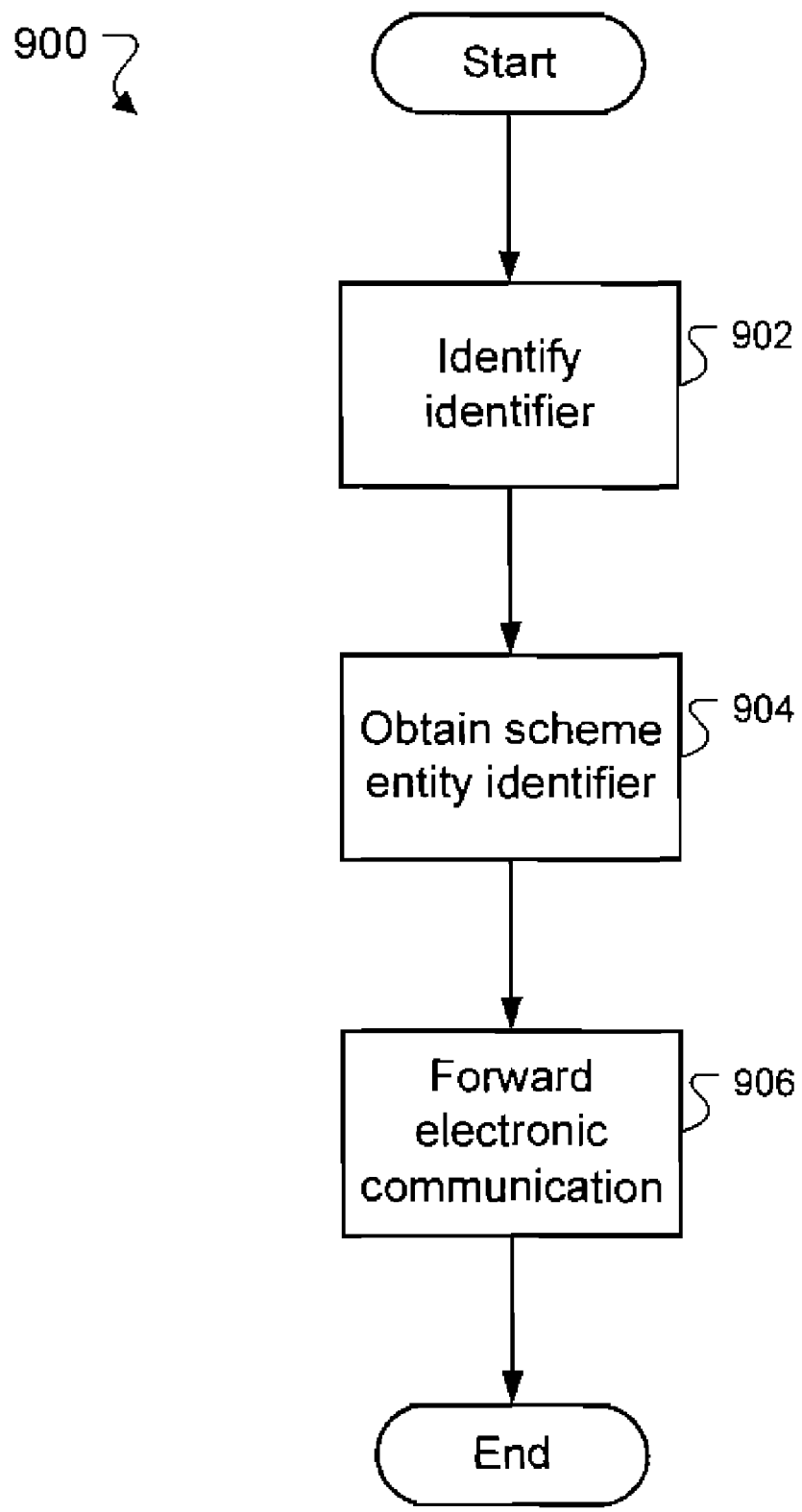
Figure 10:
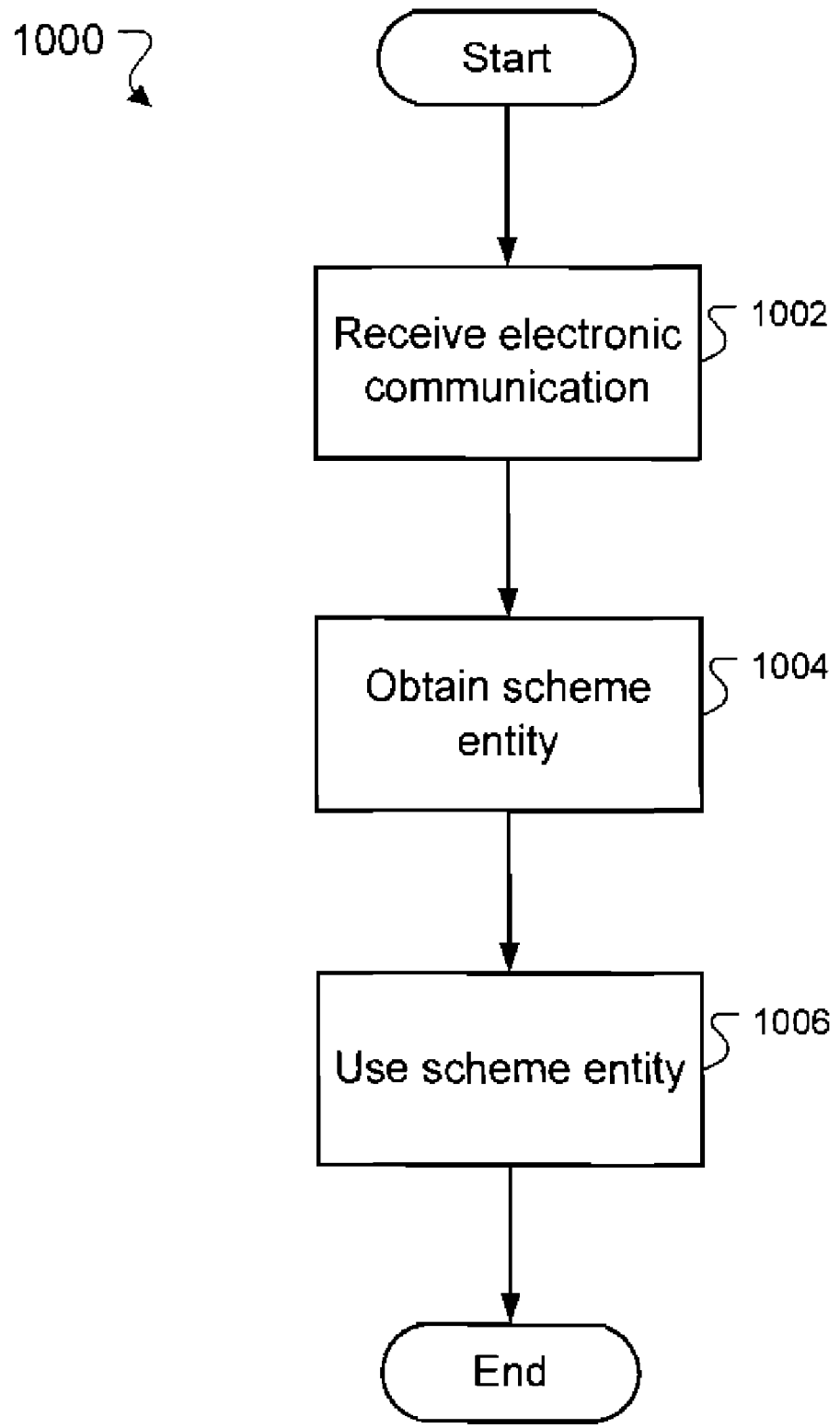

FIGS. 8-10 are exemplary flowcharts showing respective methods 800, 900 and 1000 that can be performed in relation to one or more identifiers. Any or all of the methods 800-1000 can be performed by a processor executing instructions embodied in a computer-readable medium. The method 800 can be performed to configure a system for an identifier scheme. The method 800 includes a step 802 of identifying an identification scheme that is to be used for generating at least one identifier for an object. For example, the system 102 (FIG. 1) can identify ISBN as the scheme for generating an identifier for a book product relating to the invoice in FIG. 3.

The method 800 includes a step 804 of creating a scheme entity that represents the identification scheme and includes at least one aspect thereof. For example, the system 102 can create the scheme entity 710 to represent the ISBN scheme. The entity 710 can include an aspect of the ISBN scheme, such as a definition of the length of the identifier, the component parts of the identifier or how to perform a checksum calculation on the identifier, to name a few examples.

The method 800 includes a step 806 of storing the created scheme entity in a repository such that the scheme entity can be selected for association with the identifier. For example, the system 102 can store the scheme entity 710 in the repository 106. The scheme entity 710 can be associated with the identifier using code 310A as shown in FIG. 3, to name one example.

One or more other steps can be performed in connection with the method 800. As another example, one or more of the steps can be performed in a different order.

The method 900 can be performed to communicate an identifier. The method 900 includes a step 902 of identifying an identifier for an object. For example, the system 102 can identify the identifier "0-3855-1322-4" for a particular book by generating that identifier according to 1SBN for the invoice relating to the book.

The method 900 includes a step 904 of obtaining a scheme entity identifier from a schema to be used for an electronic communication. The scheme entity identifier is associated with a scheme entity that represents an identification scheme for generating the identifier. For example, the system 102 can obtain the identifier "ISO2108" (FIG. 3) for the ISBN identification schema. The ISBN schema can be represented by the scheme entity 210 (or 710) and the obtained scheme entity identifier can be associated with this scheme entity, to name just one example.

The method 900 includes a step 906 of forwarding the electronic communication, including the identified identifier and the obtained scheme entity identifier. For example, the system 102 can forward an invoice that includes the code 300 (FIG. 3). Code 308 can include the identified identifier and code 310A can include the obtained scheme entity identifier, to name just one example.

One or more other steps can be performed in connection with the method 800. As another example, one or more of the steps can be performed in a different order.

The method 1000 can be performed to process a received identifier The method 1000 includes a step 1002 of receiving an electronic communication that includes an identifier indicated by an identifier element. For example, the system 104 (FIG. 1) can receive a communication that includes the invoice shown in FIG. 3. The invoice can include the identified identifier and code 310A can include the obtained scheme entity identifier, to name just one example.

The method 1000 includes a step 1004 of obtaining, from a schema applicable to the electronic communication, a scheme entity that represents an identification scheme for the identifier and includes at least one aspect of the identification scheme. For example, the repository 106 can include a schema that applies to the invoice that the system 104 has received. The system can obtain the scheme entity 210 (or 710) from the schema after or before receiving the invoice. The scheme entity can represent the ISBN scheme and include an identifier formatting rule thereof, or a checksum calculation function, to name two examples.

The method 1000 includes a step 1006 of using the scheme entity in processing the identifier. For example, the system 104 can use the scheme entity to interpret the received identifier As another example, the system 104 can perform a checksum calculation on the identifier (assuming that a checksum value is available.

One or more other steps can be performed in connection with the method 800. As another example, one or more of the steps can be performed in a different order.

Figure 11:
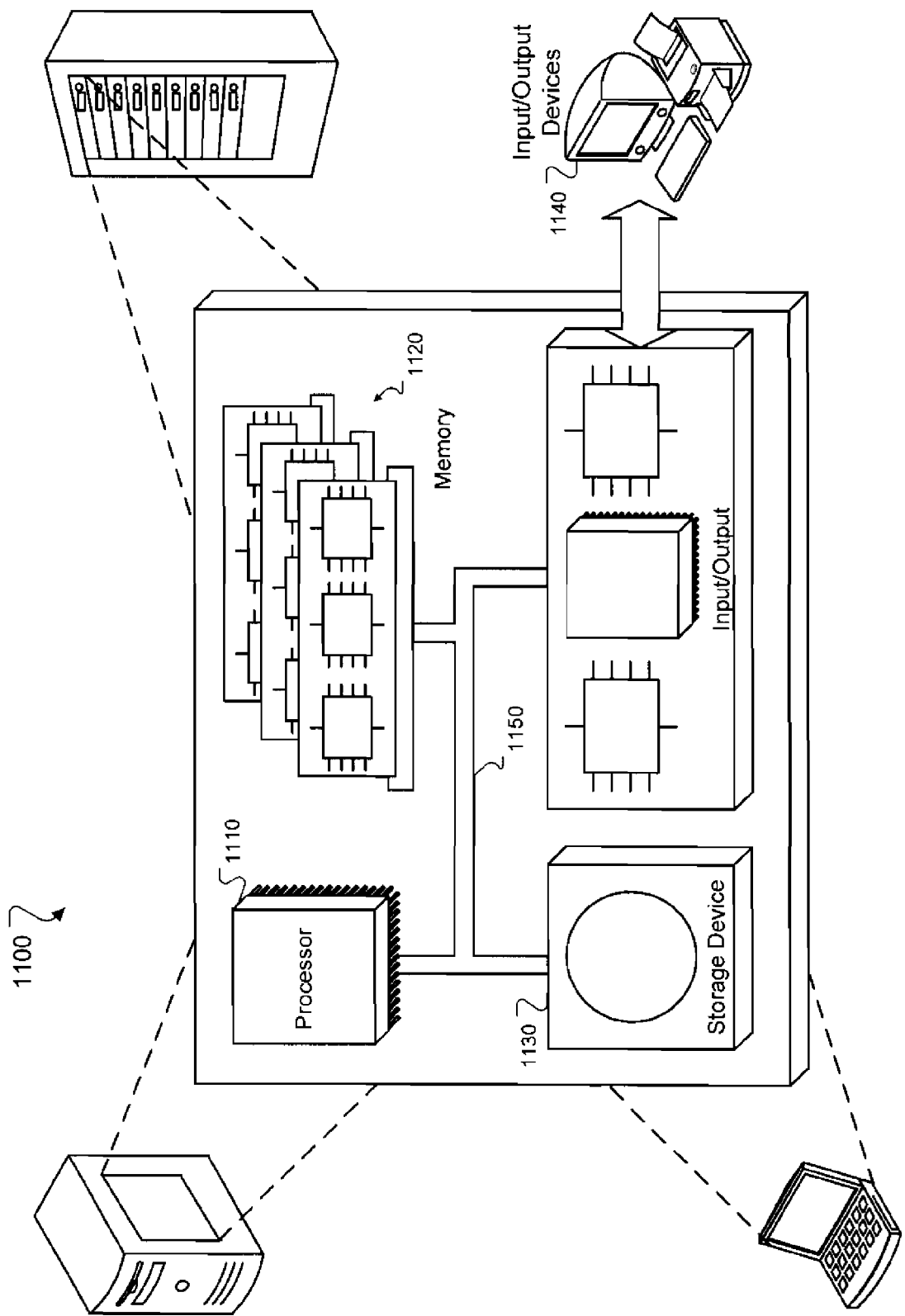
FIG. 11 is a block diagram of a computing system that can be used in connection with computer-implemented methods described in this document.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140. The system may be implemented, for example, on an individual computer 1100 or on a parallel cluster of computer systems 1100 distributed over a network.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of configuring a system for an identification scheme, the method comprising:
   identifying an identification scheme that is to be used for generating at least one identifier for an object and that defines a structure for the identifier, wherein the structure identifies multiple parts that make up the identifier;
   creating a scheme entity that (i) represents the identification scheme, (ii) includes at least one aspect thereof, (iii) is configured for use in generating at least first and second parts of the multiple parts of the identifier, and that (iv) includes a definition for each of the first and second parts, wherein the scheme entity is configured to include:
   (a) in the definition for the first part, a specification whether the first part is to be concatenated with a third part of the identifier, and if the first part is not to be concatenated with the third part, a specification of a type of separation sign to place between the first part and the third part,
   (b) in the definition for the second part, a specification whether the second part is to be concatenated with a fourth part of the identifier, and if the second part is not to be concatenated with the fourth part, a specification of a type of separation sign to place between the second part and the fourth part,
   (c) in the definition for the first part, a specification of a first set of characters that are allowed for the first part without specifying an allowed quantity of characters of the first set, and
   (d) in the definition for the second part, a specification of a second set of characters that are allowed for the second part and an allowed quantity of the second set of characters, and a specification of a third set of characters that are allowed for the second part and an allowed quantity of the third set of characters; and
   storing the created scheme entity in a repository such that the scheme entity can be selected for association with the identifier.

2. The computer-implemented method of claim 1, wherein the system comprises an object model defining that a type of the object is associated with at least one identifier type to be associated with the identifier.

3. The computer-implemented method of claim 1, wherein the identification scheme defines a structure for generating the identifier, including multiple parts each defining a pattern for the identifier.

4. The computer-implemented method of claim 1, wherein the aspect comprises a maximum length for generating the identifier.

5. The computer-implemented method of claim 1, wherein the aspect comprises a formatting regulation for generating the identifier.

6. The computer-implemented method of claim 1, wherein the aspect comprises at least one rule for construing content of the identifier.

7. The computer-implemented method of claim 1, wherein the aspect comprises an identification of a function to be performed on the identifier for determining a validity of the identifier.

8. The computer-implemented method of claim 1, wherein the scheme entity is created such that the identifier is defined as comprising several parts, at least one of the parts including a value of a data element for a document.

9. The computer-implemented method of claim 8, wherein the scheme entity is configured to reference the value of the data element.

10. The computer-implemented method of claim 9, wherein the data element specifies a context in which the identifier is unique.

11. The computer-implemented method of claim 8, wherein the scheme entity is configured to concatenate the value of the data element.

12. The computer-implemented method of claim 11, wherein the identifier is to be construed at least in part from the data element, and wherein the identifier is unique regarding a type of the object.

13. A computer program product tangibly embodied in a machine-readable storage device and comprising instructions that when executed by a processor perform a method of configuring a system for an identification scheme, the method comprising:
  identifying an identification scheme that is to be used for generating at least one identifier for an object and that defines a structure for the identifier, wherein the structure identifies multiple parts that make up the identifier;
  creating a scheme entity that (i) represents the identification scheme, (ii) includes at least one aspect thereof, (iii) is configured for use in generating at least first and second parts of the multiple parts of the identifier, and that (iv) includes a definition for each of the first and second parts, wherein the scheme entity is configured to include:
    (a) in the definition for the first part, a specification whether the first part is to be concatenated with a third part of the identifier, and if the first part is not to be concatenated with the third part, a specification of a type of separation sign to place between the first part and the third part,
    (b) in the definition for the second part, a specification whether the second part is to be concatenated with a fourth part of the identifier, and if the second part is not to be concatenated with the fourth part, a specification of a type of separation sign to place between the second part and the fourth part,
    (c) in the definition for the first part, a specification of a first set of characters that are allowed for the first part without specifying an allowed quantity of characters of the first set, and
    (d) in the definition for the second part, a specification of a second set of characters that are allowed for the second part and an allowed quantity of the second set of characters, and a specification of a third set of characters that are allowed for the second part and an allowed quantity of the third set of characters; and
  storing the created scheme entity in a repository such that the scheme entity can be selected for association with the identifier.

14. A system that includes:
a programmable processor; and
computer program product tangibly embodied in a machine-readable storage device and comprising instructions that when executed by the processor perform operations, wherein the operations include:
  identifying an identification scheme that is to be used for generating at least one identifier for an object and that defines a structure for the identifier, wherein the structure identifies multiple parts that make up the identifier;
  creating a scheme entity that (i) represents the identification scheme, (ii) includes at least one aspect thereof, (iii) is configured for use in generating at least first and second parts of the multiple parts of the identifier, and that (iv) includes a definition for each of the first and second parts, wherein the scheme entity is configured to include:
    (a) in the definition for the first part, a specification whether the first part is to be concatenated with a third part of the identifier, and if the first part is not to be concatenated with the third part, a specification of a type of separation sign to place between the first part and the third part,
    (b) in the definition for the second part, a specification whether the second part is to be concatenated with a fourth part of the identifier, and if the second part is not to be concatenated with the fourth part, a specification of a type of separation sign to place between the second part and the fourth part,
    (c) in the definition for the first part, a specification of a first set of characters that are allowed for the first part without specifying an allowed quantity of characters of the first set, and
    (d) in the definition for the second part, a specification of a second set of characters that are allowed for the second part and an allowed quantity of the second set of characters, and a specification of a third set of characters that are allowed for the second part and an allowed quantity of the third set of characters; and
  storing the created scheme entity in a repository such that the scheme entity can be selected for association with the identifier.

* * * * *